US012780075B2

(12) United States Patent
Kwon

(10) Patent No.: US 12,780,075 B2
(45) Date of Patent: Nov. 3, 2026

(54) CABIN FOR MOVABLE OBJECT AND MOVABLE OBJECT INCLUDING THE SAME

(71) Applicants: HYUNDAI MOTOR COMPANY, Seoul (KR); Kia Corporation, Seoul (KR)

(72) Inventor: Seok Ryung Kwon, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 156 days.

(21) Appl. No.: 18/945,207

(22) Filed: Nov. 12, 2024

(65) Prior Publication Data

US 2025/0381905 A1 Dec. 18, 2025

(30) Foreign Application Priority Data

Jun. 17, 2024 (KR) ........................ 10-2024-0078312

(51) Int. Cl.
*B60P 3/00* (2006.01)

(52) U.S. Cl.
CPC .................................... *B60P 3/007* (2013.01)

(58) Field of Classification Search
CPC .............. B60P 3/00; B60P 3/002; B60P 3/007
USPC ...................................................... 296/146.1
See application file for complete search history.

(56) References Cited

U.S. PATENT DOCUMENTS

| | | | |
|---|---|---|---|
| 7,766,407 | B2 | 8/2010 | Nakaya |
| 8,186,734 | B2 | 5/2012 | Nakaya |
| 11,492,834 | B2 | 11/2022 | Principe et al. |
| 2006/0290144 | A1 | 12/2006 | Nakaya |
| 2011/0000135 | A1 | 1/2011 | Nakaya |

FOREIGN PATENT DOCUMENTS

| | | | |
|---|---|---|---|
| JP | 4703287 | B2 | 6/2011 |
| JP | 4738991 | B2 | 8/2011 |

*Primary Examiner* — Steven O Douglas
(74) *Attorney, Agent, or Firm* — Fish & Richardson P.C.

(57) ABSTRACT

A cabin for a movable object includes a body having an opening, a cover configured to open and close the opening, and a cover moving part disposed in the body, coupled to the cover, and configured to linearly move or rotate the cover. The cover moving part includes a link member connected to the cover and configured to transmit power to the cover. The link member includes a first link connected to a rotary shaft and a second link that connects the first link to the cover, where the second link is stretchable and contractible to thereby adjust a spacing distance between two opposite ends of the second link.

14 Claims, 17 Drawing Sheets

CABIN FOR MOVABLE OBJECT AND MOVABLE OBJECT INCLUDING THE SAME

CROSS-REFERENCE TO RELATED APPLICATION

This application claims priority to and the benefit of Korean Patent Application No. 10-2024-0078312 filed in the Korean Intellectual Property Office on Jun. 17, 2024, the entire contents of which are incorporated herein by reference.

TECHNICAL FIELD

The present disclosure relates to a cabin for a movable object and a movable object including the same.

BACKGROUND

Various types of movable objects may substitute for human labor. For example, with the growth of the delivery industry, movable objects may be capable of delivering food, items, or the like in an unmanned manner.

In some cases, the movable objects may be configured by coupling a cabin, which is configured to store food, items, or the like therein, and a movable part coupled to the cabin and configured to move the cabin. In some cases, cabins are configured in such a way that a cover, which is configured to close an opening through which food, an item, or the like is loaded or unloaded, opens or closes the opening by rotating about a shaft.

For example, a cabin may have a cylindrical body. In this case, the cover may have a shape of a part of an outer peripheral surface of a cylinder. In this case, the cover and the body have a predetermined step difference so that the cover smoothly opens or closes the opening. In some cases, foreign substances may be introduced because of the step difference, hinder the operation of the cover, or remain in an internal space.

In some cases, a cabin may include a cover performs a rectilinear motion and a rotational motion to remove a step difference. In some cases, several devices for operating the cover may be provided, which may increase the weight and unit price of the movable object.

SUMMARY

The present disclosure describes a cabin for a movable object, which is capable of removing a step difference between a cover and a body by a single operating member, and a movable object including the same.

According to one aspect of the subject matter described in this application, a cabin for a movable object includes a body that defines (i) an opening opened in a first direction and (ii) an internal space that is in fluid communication with the opening, a cover configured to open and close at least a portion of the opening, and a cover moving part disposed in the internal space of the body and coupled to the cover, the cover moving part being configured to at least one of linearly move the cover or rotate the cover. The cover moving part includes (i) an operating member including an operating rotation shaft that extends in an axial direction intersecting the first direction, the operating member being disposed at the body and configured to rotate about the operating rotation shaft, and (ii) a link member that connects the operating member and the cover to each other and is configured to transmit power generated by the operating member to the cover. The link member includes a first link connected to the operating member and configured to rotate about the operating rotation shaft, and a second link that connects the first link to the cover, the second link having (i) a first end rotatably connected to the first link and (ii) a second end rotatably connected to the cover, where the second link is configured to stretch and contract to thereby increase and decrease a distance between the first and second ends of the second link.

Implementations according to this aspect can include one or more of the following features. For example, the second link may include a first region that is rotatably connected to the first link and defines the first end of the second link, a second region that is rotatably connected to the cover and defines the second end of the second link, and an elastic member disposed between the first region and the second region. The elastic member may be configured to, based on being stretched to a stretched state, define a maximum spacing distance between the first and second ends of the second link, and based on being contracted to a contracted state, define the distance between the first region and the second region that is less than the maximum spacing distance, where the elastic member is configured to, in the contracted state, apply a restoring force that pushes the first region and the second region away from each other.

In some implementations, the second link may extend in a link direction in which the first region and the second region face each other, where the second link further includes a stretch/contraction guide that connects the first region to the second region in the link direction and is configured to guide movement of the elastic member in the link direction. In some examples, the elastic member has a coil spring shape having a hollow portion that extends in the link direction, where the stretch/contraction guide passes through the hollow portion of the elastic member.

In some examples, the elastic member may be one of a plurality of elastic members disposed between the first region and the second region, where the stretch/contraction guide is one of a plurality of stretch/contraction guides that are respectively disposed in the plurality of elastic members, and a number of the plurality of elastic members is equal to a number of the plurality of stretch/contraction guides.

In some implementations, the second link may define an insertion groove in the first region, the insertion groove extending in the link direction and being configured to receive a part of the stretch/contraction guide inserted into the insertion groove, where the stretch/contraction guide includes a column portion surrounded by the elastic member; and a protruding portion disposed at an end of the column portion at the first region and inserted in the insertion groove, the protruding portion protruding from the column portion in a direction intersecting the link direction. The first region may include a catching portion that protrudes from a wall surface that surrounds the insertion groove toward a center of the insertion groove, the catching portion being configured to catch the protruding portion in the insertion groove. In some examples, an end of the protruding portion and an end of the catching portion face each other in the link direction and are configured to contact each other based on the elastic member being in the stretched state, and separate from each other based on the elastic member being in the contracted state.

In some implementations, the first link and the second link may be configured to define an obtuse angle between (i) a first straight line that radially extends from the operating rotation shaft to a first rotation center at an end of the first link connected to the first end of the second link and (ii) a second straight line that extends from the first rotation center of the first link to a second rotation center of the second link at the second end of the second link connected to the cover, where a size of the obtuse angle defined between the first straight line and the second straight line in the contracted state of the elastic member is greater than equal to a size of the obtuse angle defined between the first straight line and the second straight line in the stretched state of the elastic member.

In some implementations, the cover faces the operating rotation shaft in an advance/retraction direction, where the advance/retraction direction is parallel to the first direction in a state in which the cover is placed in a closed state in which the cover closes the opening. The cover moving part may include an advance/retraction movement member configured to linearly move in the advance/retraction direction relative to the body, the advance/retraction movement member having (i) a first side fixed to the cover and (ii) a second side rotatably connected to the second link. In some examples, the advance/retraction movement member may include a first advance/retraction movement part fixed to the cover, and a second advance/retraction movement part having one side fixed to the first advance/retraction movement part and another side rotatably connected to the second link, where the cover moving part further includes a rotational movement member configured to revolve the advance/retraction movement member about the operating rotation shaft along a predetermined rotation radius. The advance/retraction movement member may define a guide hole that passes through the advance/retraction movement member in the axial direction of the operating rotation shaft and receives the second advance/retraction movement part, where the guide hole extends in the advance/retraction direction and is configured to guide linear movements of the first advance/retraction movement part and the second advance/retraction movement part in the advance/retraction direction.

In some examples, the body may define a guide groove recessed toward one side of the body in the axial direction of the operating rotation shaft, where the advance/retraction movement member further includes an insertion part that is inserted into the guide groove and protrudes toward the one side of the body relative to the first advance/retraction movement part in the axial direction of the operating rotation shaft, wherein the rotational movement member is configured to revolve the advance/retraction movement member in a revolution direction. The guide groove may include an advance/retraction guide region extending in a second direction that is opposite to the first direction, and a rotation guide region extending in the revolution direction from an end of the advance/retraction guide region.

In some implementations, the guide groove may further include an intersection region in which the advance/retraction guide region and the rotation guide region intersect each other, where the cover is configured to be directed toward the operating rotation shaft in an inward advance/retraction direction, and a curvature of an end of the intersection region in the second direction corresponds to a curvature of an inner side of the rotation guide region in the inward advance/retraction direction.

According to another aspect, a movable object includes a cabin and a movable part connected to the cabin and configured to move the cabin. The cabin includes:

a body that defines (i) an opening opened in a first direction and (ii) an internal space that is in fluid communication with the opening, a cover configured to open and close the opening, and a cover moving part disposed in the internal space of the body and coupled to the cover, the cover moving part being configured to at least one of linearly move or rotate the cover. The cover moving part includes an operating member including an operating rotation shaft that extends in an axial direction intersecting the first direction, the operating member being disposed at the body and configured to rotate about the operating rotation shaft, and a link member that connects the operating member and the cover to each other and is configured to transmit power generated by the operating member to the cover. The link member includes a first link connected to the operating member and configured to rotate about the operating rotation shaft, and a second link that connects the first link to the cover, the second link having (i) a first end rotatably connected to the first link and (ii) a second end rotatably connected to the cover, where the second link is configured to stretch and contract to thereby increase and decrease a distance between the first and second ends of the second link.

Implementations according to this aspect can include one or more of the following features and the features described above. For example, the movable part may include one or more wheels disposed below the cabin.

In some implementations, the rectilinear motion and the rotational motion of the cover may be performed by the single operating member, such that a step difference between the cover and the body may be eliminated, the weight of the movable object may be reduced, and the manufacturing costs may be reduced.

DETAILED DESCRIPTION

Figure 1:
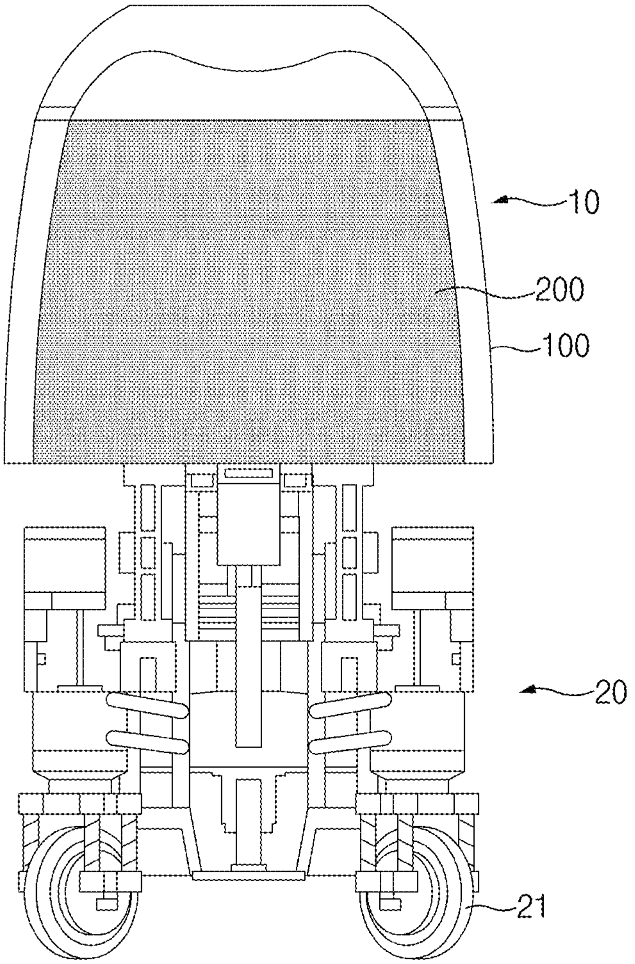
FIG. 1 is a view illustrating an example of a movable object.

Hereinafter, one or more implementations of the present disclosure will be described in detail with reference to the illustrative drawings. In giving reference numerals to constituent elements of the respective drawings, the same constituent elements will be designated by the same reference numerals, if possible, even though the constituent elements are illustrated in different drawings. Further, in the following description of the exemplary implementations of the present disclosure, a detailed description of publicly known configurations or functions incorporated herein will be omitted when it is determined that the detailed description obscures the subject matters of the exemplary implementations of the present disclosure.

In some implementations, a cabin 10 may be provided for a movable object. The cabin 10 for a movable object may refer to a structure coupled to a movable part 20 of a movable object and configured to accommodate items therein. The movable object may refer to a structure capable of moving by the movable part such as a wheel or a propeller. Examples of the movable objects may include various examples such as vehicles and drones.

Figure 2:
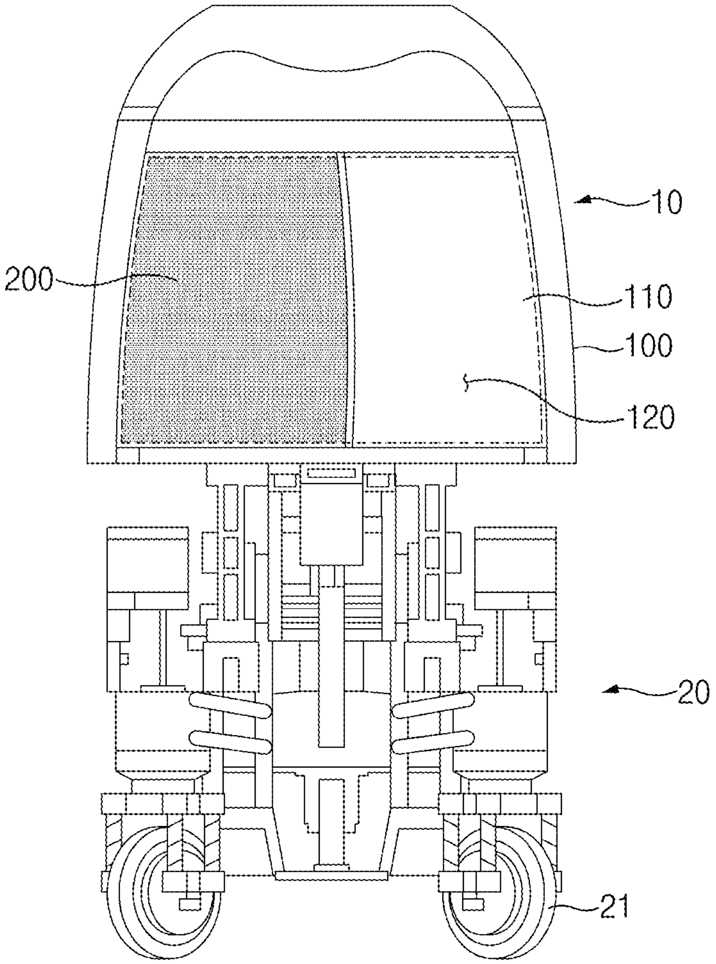
FIG. 2 is a view illustrating an example of a cover in FIG. 1 that is opened.

FIG. 1 is a view illustrating a movable object. FIG. 2 is a view illustrating a situation in which a cover in FIG. 1 is opened.

In some implementations, as illustrated in FIG. 1, the movable object may include the cabin 10 and the movable part 20. The movable part 20 may be coupled to the cabin 10 and configured to move the cabin 10. For example, as illustrated in FIG. 1, the movable part 20 may include wheels 21. However, this configuration is provided for illustrative purposes only. Various modified examples, such as a drone configured to move the cabin 10 by using a propeller or the like, may be implemented within a range in which the cabin 10 may be moved.

Figure 3:
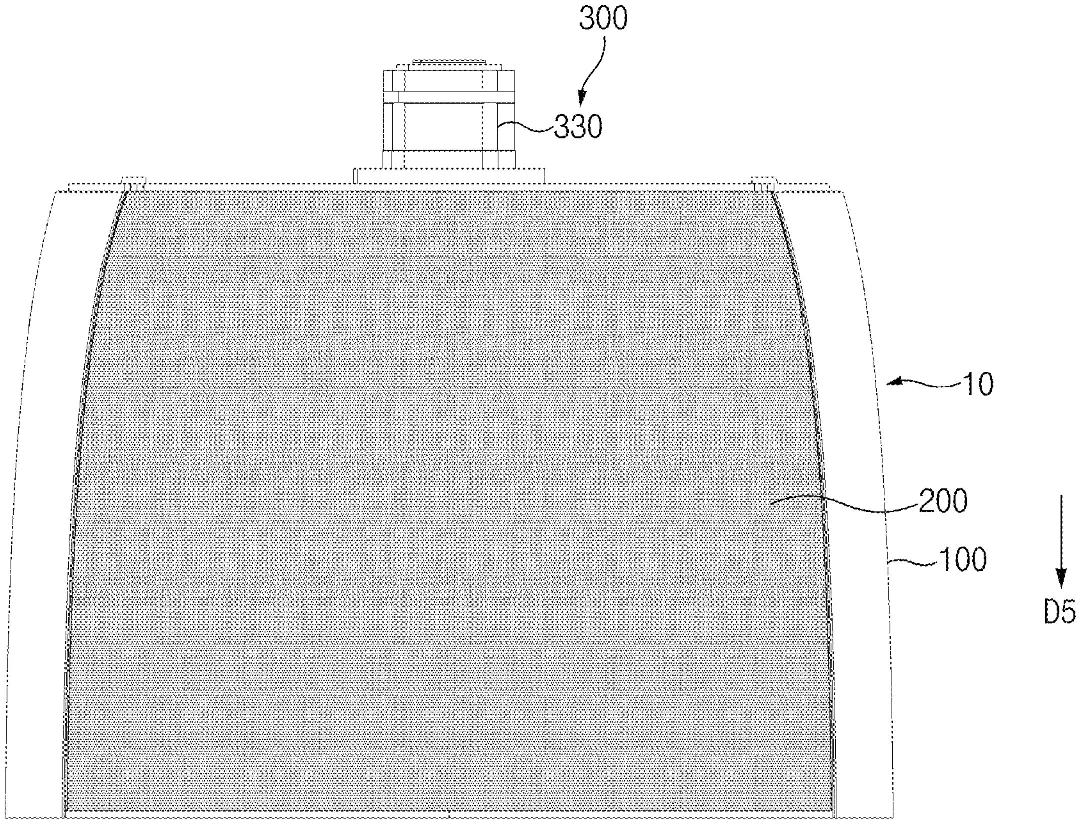
FIG. 3 is a view illustrating an example of a cabin for a movable object.
Figure 4:
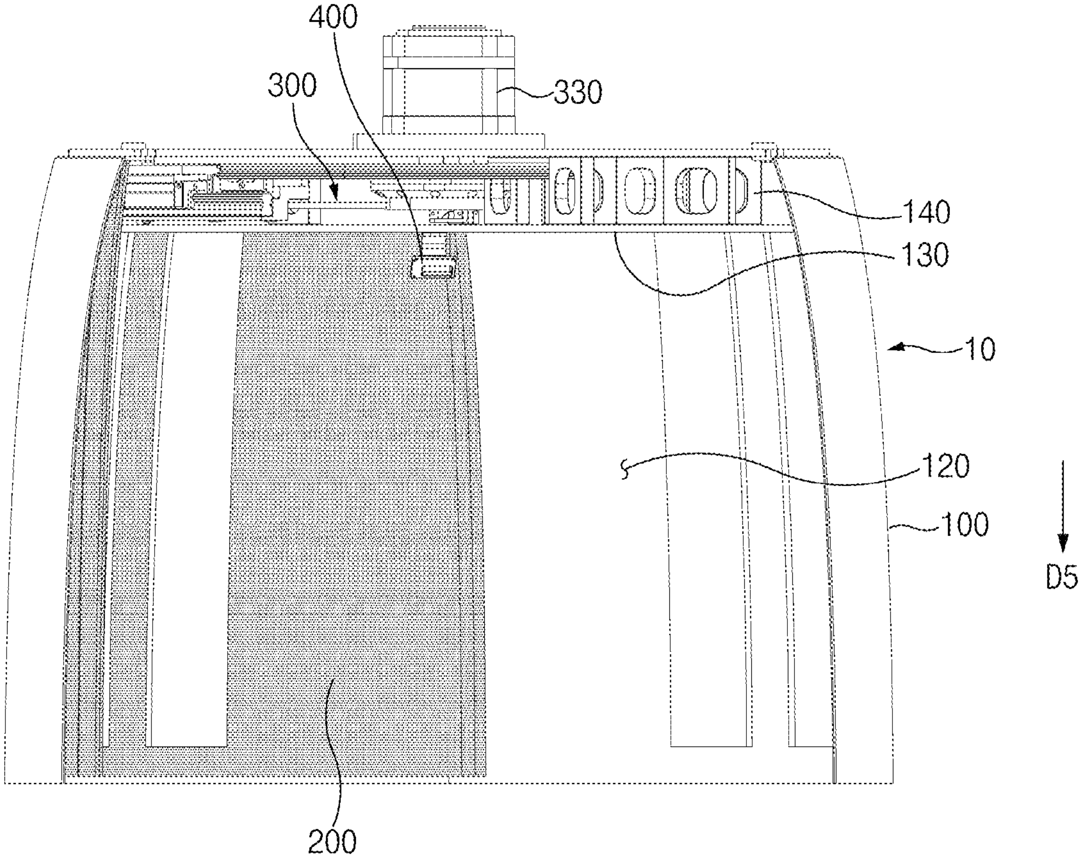
FIG. 4 is a view illustrating the cover in FIG. 3 that is opened.

FIG. 3 is a view illustrating the cabin for a movable object. FIG. 4 is a view illustrating a situation in which the cover in FIG. 3 is opened. For reference, some components, such as a shield member 130 (FIG. 5), may be excluded from the following drawings to describe the operation.

The cabin 10 may include a body 100, a cover 200, and a cover moving part 300. The body 100 may include an opening 110. The opening 110 may be opened in a predetermined first direction D1. In addition, the body 100 may define an internal space 120 that communicates with the opening 110. A user may dispose items in the internal space 120 through the opening 110. For example, a shape of the body 100 may be a part of a cylindrical shape. However, the present disclosure is not limited thereto. The body 100 may be transformed into various shapes depending on the user's needs. The first direction D1 may be understood as a direction from the internal space 120 toward the body 100 through the opening 110.

The cover 200 may be configured to open or close the opening 110. In some examples, the cover 200 may have a shape corresponding to the opening 110. For example, the cover 200 may have a curved shape that is a part of an outer peripheral surface of a cylinder.

The cover moving part 300 may be coupled to the cover 200 and configured to move the cover 200 (for example, rectilinearly move or rotate the cover 200). Hereinafter, a state in which the cover 200 closes the opening 110 is referred to as a closed state, and a state in which the cover 200 opens the opening 110 is referred to as an open state. In the closed state, the cover 200 may define a continuous surface by coming into contact with a portion that defines the opening 110 of the body 100.

Hereinafter, maneuvers performed by the cover moving part 300 when the state changes from the closed state to the open state will be described. This maneuver may be a situation in which the opening 110 is opened to load items and the like into the internal space 120.

The cover moving part 300 may perform a first maneuver. The first maneuver may be a maneuver of moving the cover 200 to the internal space 120 in a second direction D2 that is a direction opposite to the first direction D1. The first maneuver may be understood as a maneuver of retracting the cover 200 toward the internal space 120 to rotate the cover 200.

Figure 5:
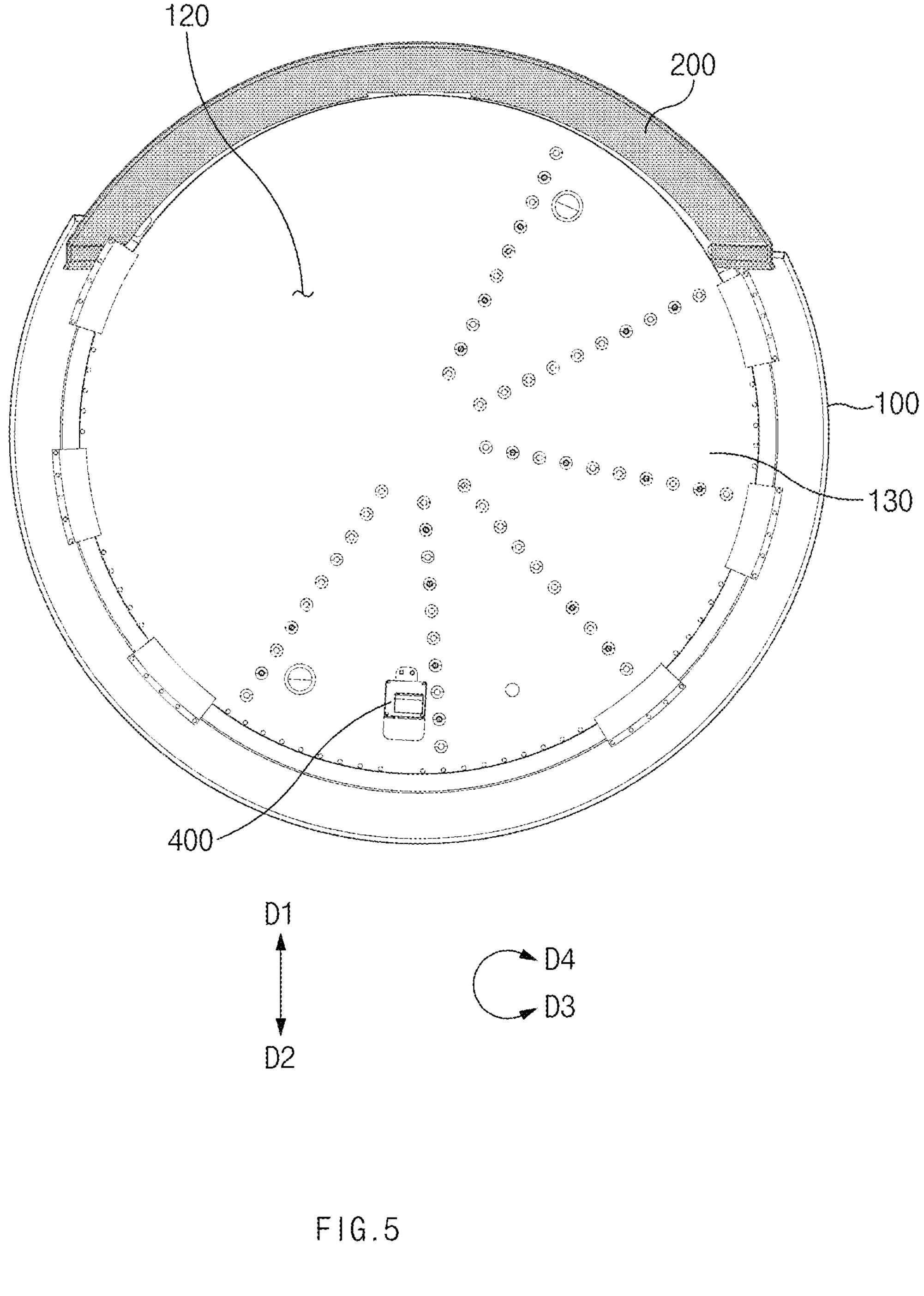
FIG. 5 is a view illustrating an example of the cabin when viewed in a fifth direction.

The cover moving part 300 may perform a second maneuver. The second maneuver may be a maneuver of rotating the cover 200 in a third direction D3 after the first maneuver. The third direction D3 may be a direction in which the cover 200 rotates about an imaginary axis spaced apart from the cover 200 in the second direction D2. Hereinafter, a direction, which is opposite to the third direction D3, is referred to as a fourth direction D4, and an extension direction of the axis is referred to as a fifth direction D5. For example, the fifth direction D5 may be a downward direction. FIG. 5 is a view illustrating the cabin for a movable object when viewed in the fifth direction.

Hereinafter, maneuvers performed by the cover moving part 300 when the state changes from the open state to the closed state will be described. This maneuver may be a situation in which the opening 110 is closed after items are completely loaded into the internal space 120.

The cover moving part 300 may perform a third maneuver. The third maneuver may be a maneuver of rotating the cover 200 in the fourth direction D4. The third maneuver may be understood as a process performed in reverse of the second maneuver.

The cover moving part 300 may perform a fourth maneuver. The fourth maneuver may be a maneuver of moving the cover 200 in the first direction D1 after the third maneuver. The fourth maneuver may be understood as a maneuver of advancing the cover 200 to close the opening 110.

Hereinafter, a specific shape of the cover moving part 300 will be described in detail.

Figure 6:
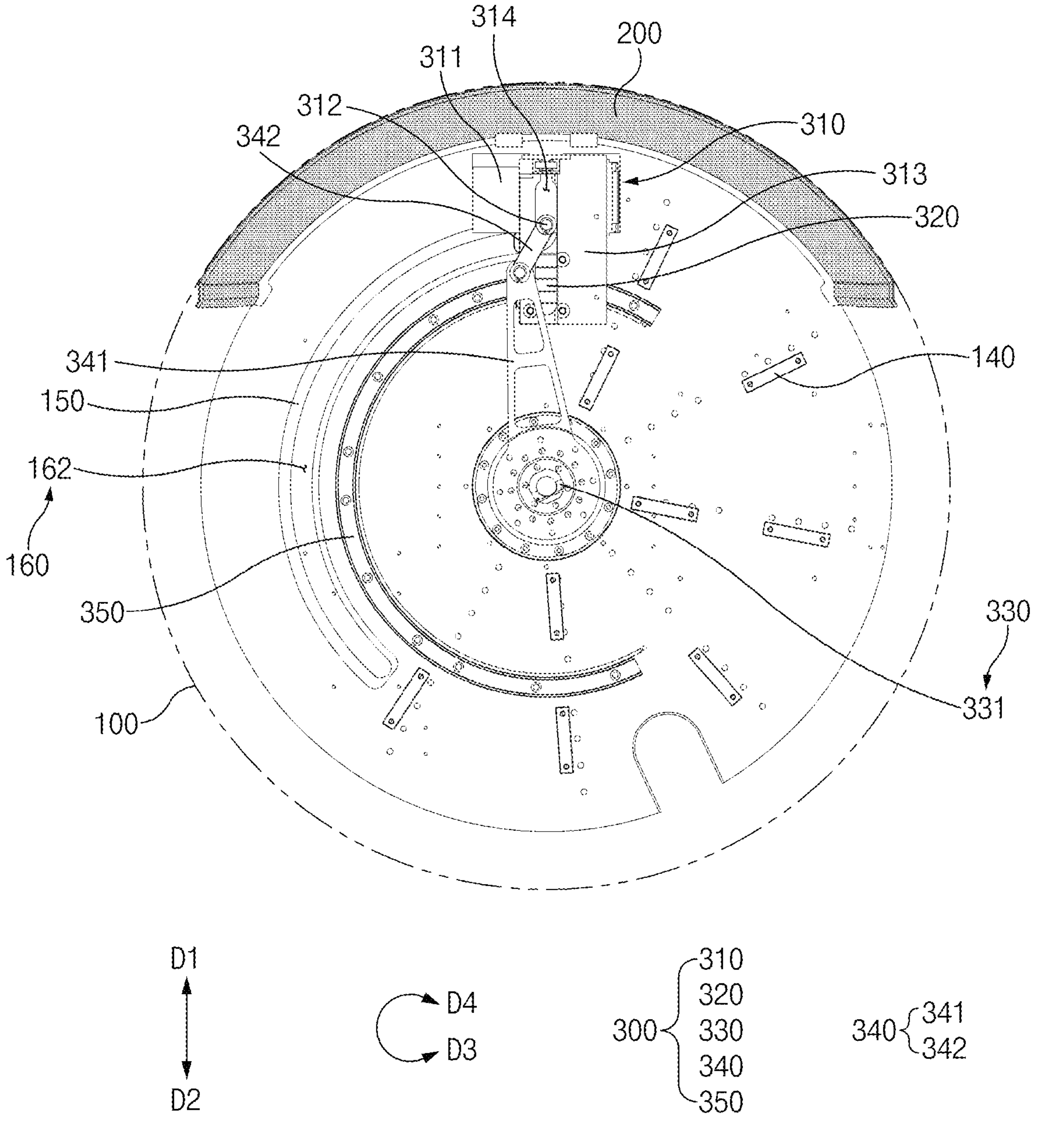
FIG. 6 is a view illustrating an example of a cover moving part in a closed state when viewed in the fifth direction in a state in which a shield member is excluded.
Figure 7:
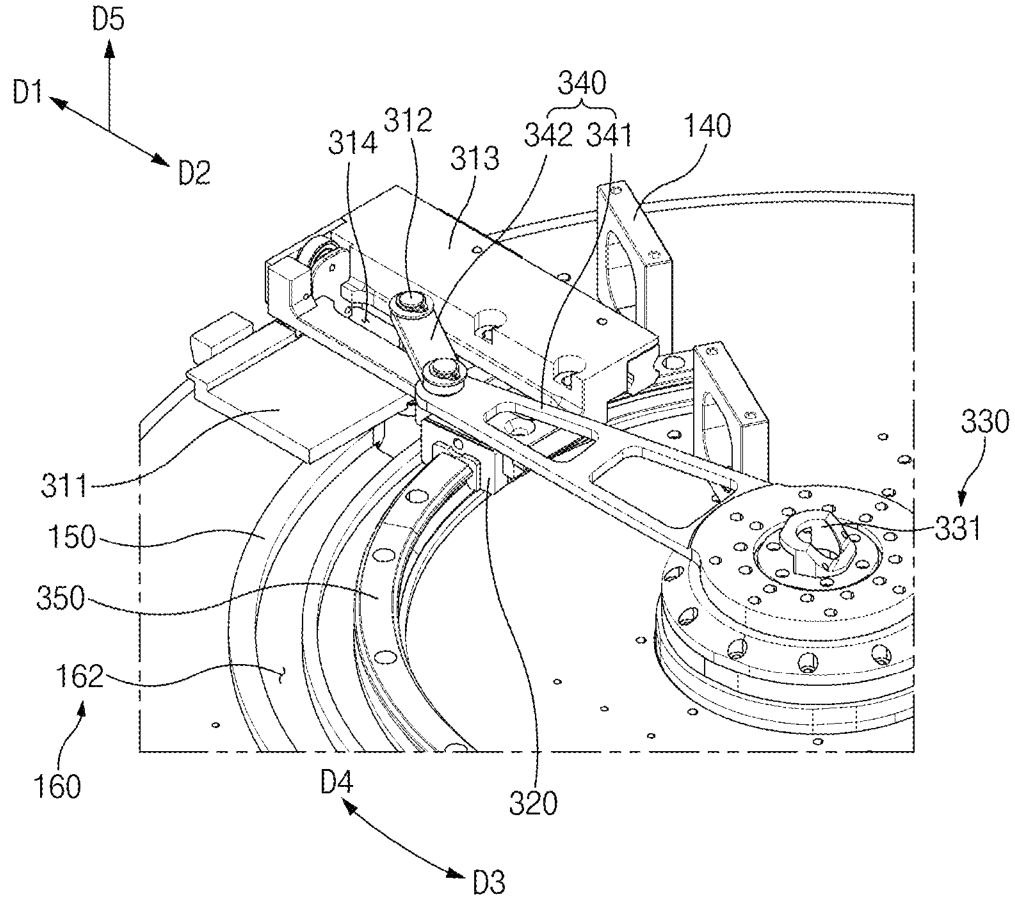
FIG. 7 is a view illustrating the cover moving part in the closed state.
Figure 8:
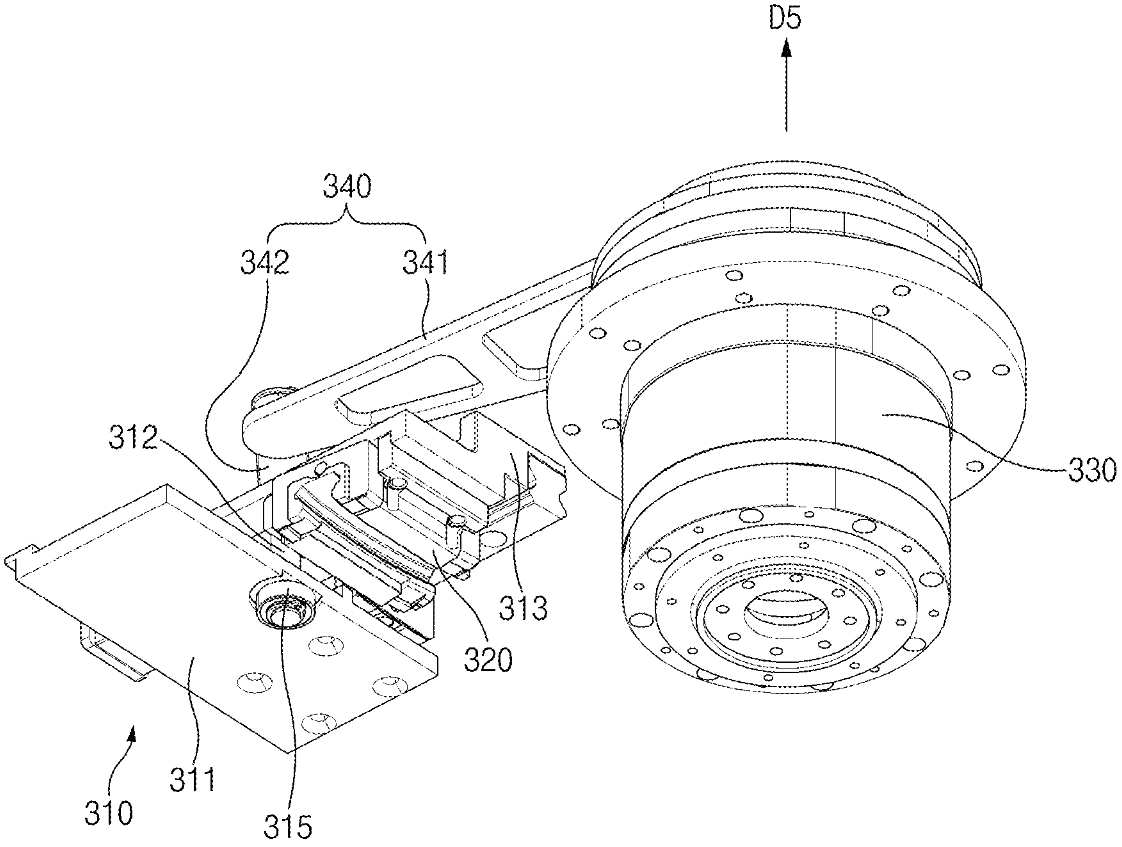
FIG. 8 is a view illustrating the cover moving part in the closed state when viewed in another direction.

FIG. 6 is a view illustrating the cover moving part in the closed state when viewed in the fifth direction in a state in which the shield member is excluded. FIG. 7 is a view illustrating the cover moving part in the closed state. FIG. 8 is a view illustrating the cover moving part in the closed state when viewed in another direction.

The cover moving part 300 may include an advance/retraction movement member 310. The advance/retraction movement member 310 may be a member configured to guide the cover 200 so that the cover 200 moves in the first direction D1 and the second direction D2. For example, the advance/retraction movement member 310 may be a member involved in performing the first maneuver and the fourth maneuver.

In some implementations, one side of the advance/retraction movement member 310 may be fixed to the cover 200, and the other side of the advance/retraction movement member 310 may be rotatably connected to a second link 342. The advance/retraction movement member 310 may rectilinearly move in an advance/retraction direction relative to the body 100. The advance/retraction direction may refer to a direction in which the cover 200 and an operating rotation shaft 331 face each other. The advance/retraction movement member 310 may include a first advance/retraction movement part 311, a second advance/retraction movement part 312, and a third advance/retraction movement part 313.

The first advance/retraction movement part 311 may be fixed to the cover 200. For example, the first advance/retraction movement part 311 may be a part of the advance/retraction movement member 310 coupled to a side of the cover 200 based on the second direction D2.

The second advance/retraction movement part 312 may be a part protruding from the first advance/retraction movement part 311 in the fifth direction D5. One side of the second advance/retraction movement part 312 may be fixed to the first advance/retraction movement part 311, and the other side of the second advance/retraction movement part 3120 may be rotatably connected to the second link 342.

A guide hole 314 may be formed in the third advance/retraction movement part 313. The guide hole 314 may be formed through the third advance/retraction movement part 313 in a direction in which the operating rotation shaft 331 extends. The guide hole 314 may extend in the advance/retraction direction. For example, the advance/retraction direction may be parallel to the first direction D1 and the second direction D2 based on the closed state.

In other words, the guide hole 314 may have a shape extending in the second direction D2 based on the closed state and be configured to be inserted into the second advance/retraction movement part 312. Because the second advance/retraction movement part 312, which protrudes from the first advance/retraction movement part 311 to which the cover 200 is coupled, is inserted into the guide hole 314 having the shape extending in the second direction D2, the cover 200 may be guided so that the cover 200 moves in the first direction D1 and the second direction D2. In other words, the guide hole 314 may guide the rectilinear movements of the first advance/retraction movement part 311 and the second advance/retraction movement part 312 in the advance/retraction direction. The guide hole 314 may be connected to a rotational movement member 320 to be described below.

In some examples, the advance/retraction movement member 310 may further include an insertion part 315. The insertion part 315 may be coupled to a side of the first advance/retraction movement part 311 based on a direction opposite to the fifth direction D5. For example, the insertion part 315 may extend from the second advance/retraction movement part 312 toward one side based on the direction of the operating rotation shaft (e.g., a direction opposite to the fifth direction D5). The insertion part 315 may penetrate the first advance/retraction movement part 311 and be positioned to be closer to a side based on the direction opposite to the fifth direction D5 than the first advance/retraction movement part 311. In other words, the insertion part 315 may have a shape protruding in the direction opposite to the fifth direction D5 relative to the first advance/retraction movement part 311.

The insertion part 315 may be a part configured to guide the second maneuver so that the second maneuver may be performed after the first maneuver is performed and to guide the fourth maneuver so that the fourth maneuver may be performed after the third maneuver is performed.

The insertion part 315 may be disposed in a guide groove 160 defined by a guide part 150 protruding in the fifth direction D5 from a surface of the body 100 based on the direction opposite to the fifth direction D5. The guide groove 160 may include an advance/retraction guide region 161 extending in the second direction D2, and a rotation guide region 162 extending in the third direction D3 from an end of the advance/retraction guide region 161 based on the second direction D2. For example, a shape of the guide groove 160 may be similar to a shape of a portion positioned at an upper side of a shape of a question mark.

For example, the insertion part 315 may include a bearing. The bearing may be configured to rotate about a bearing axis extending in the fifth direction D5 and be in contact with the guide part 150. The use of the bearing may allow the cover 200 to more softly move. For example, the bearing may be disposed at a side of the second advance/retraction movement part 312 based on the direction opposite to the fifth direction D5.

In some implementations, the cover moving part 300 may further include an operating member 330 and a link member 340. The operating member 330 may have the rotary shaft 331 extending in the fifth direction D5. The rotary shaft 331 of the operating member 330 may be referred to as 'the operating rotation shaft 331'. The operating member 330 may rotate the rotary shaft 331 in the third direction D3 and the fourth direction D4. For example, the operating member 330 may be an electric motor. The operating member 330 may be rotatably mounted on a central portion of the body 100.

The link member 340 may connect the operating member 330 and the advance/retraction movement member 310. For example, the link member 340 may connect the rotary shaft 331 of the operating member 330 and the second advance/retraction movement part 312 of the advance/retraction movement member 310. Because the operating member 330 and the advance/retraction movement member 310 are connected to each other, the cover 200 may be advanced or retracted by the advance/retraction movement member 310 when the operating member 330 rotates the rotary shaft 331. The link member 340 may transmit power, which is generated by the operating member 330, to the cover 200. For example, power generated by the operating member 330 may be sequentially transmitted to the link member 340, the advance/retraction movement member 310, and the cover 200.

The link member 340 may include a first link 341 and the second link 342. The first link 341 may be a part configured to rotate in conjunction with the rotation of the rotary shaft 331. The first link 341 may be fixed to the operating member 330 and rotate together with the operating member 330.

The second link 342 may be rotatably coupled to an end of the first link 341 and rotatably coupled to the second advance/retraction movement part 312. A length of the first link 341 may be longer than a length of the second link 342.

In some examples, a structure in which the operating member 330, the link member 340, and the advance/retraction movement member 310 are connected may be similar to a slider-crank structure. In this case, the first link 341 may serve as a crank, and the second link 342 may serve as a connecting rod.

Because the advance/retraction movement member 310 may be advanced or retracted by the rotation of the rotary shaft 331 of the operating member 330, a structure, such as a linear motor, for the advance/retraction movement may not be provided, which may simplify the structure and reduce the weight and costs.

In some implementations, the cover moving part 300 may include the rotational movement member 320. The rotational movement member 320 may be a member configured to guide the cover 200 so that the cover 200 rotates in the third direction D3 and the fourth direction D4. For example, the rotational movement member 320 may be a member involved in performing the second maneuver and the third maneuver.

The cover moving part 300 may further include a rail member 350. The rail member 350 may protrude from the body 100 and extend in the third direction D3. The rotational movement member 320 may be seated on the rail member 350. In this case, the seating may be understood as a configuration in which the rotational movement member is seated on the rail member by gravity, and a state in which the rotational movement member may movably engage with the rail member. The second maneuver is performed when the rotational movement member 320 seated on the rail member 350 moves in the third direction D3. In addition, the third maneuver is performed when the rotational movement member 320 seated on the rail member 350 moves in the fourth direction D4.

Hereinafter, an outer side of a radius of an imaginary circle having a shape corresponding to the rail member 350 is referred to as a radially outer side. The first advance/retraction movement part 311 may be disposed at the radially outer side of the rail member 350. In addition, the guide part 150 may be disposed at the radially outer side of the rail member 350.

The third advance/retraction movement part 313 may be coupled to the rotational movement member 320. For example, the rotational movement member 320 may be configured to move together with the advance/retraction movement member 310 when the advance/retraction movement member 310 moves. The guide hole 314 and the rail member 350 may partially overlap each other when viewed in the fifth direction D5.

Figure 9:
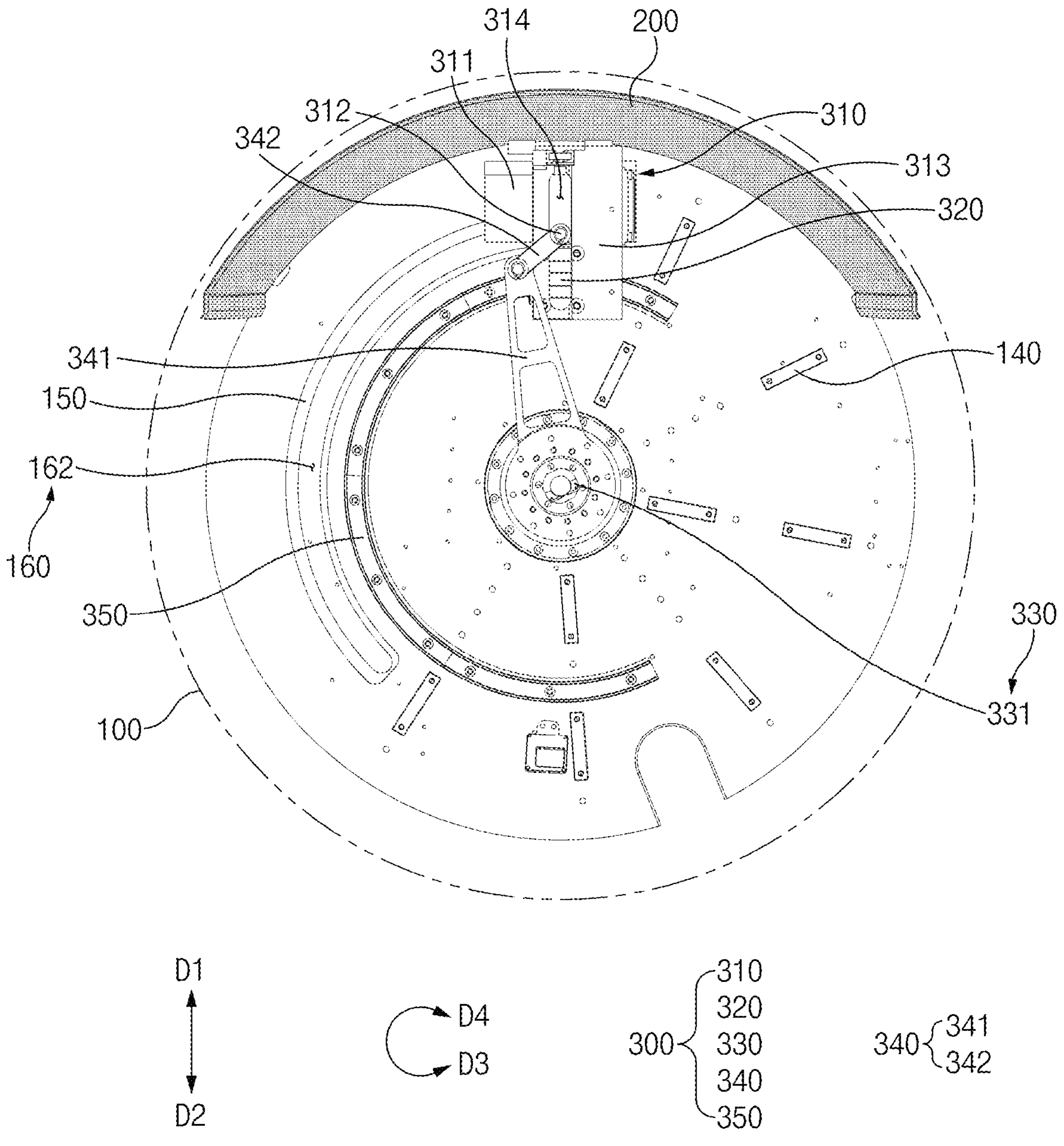
FIG. 9 is a view illustrating an example of a first maneuver performed in FIG. 6.
Figure 10:
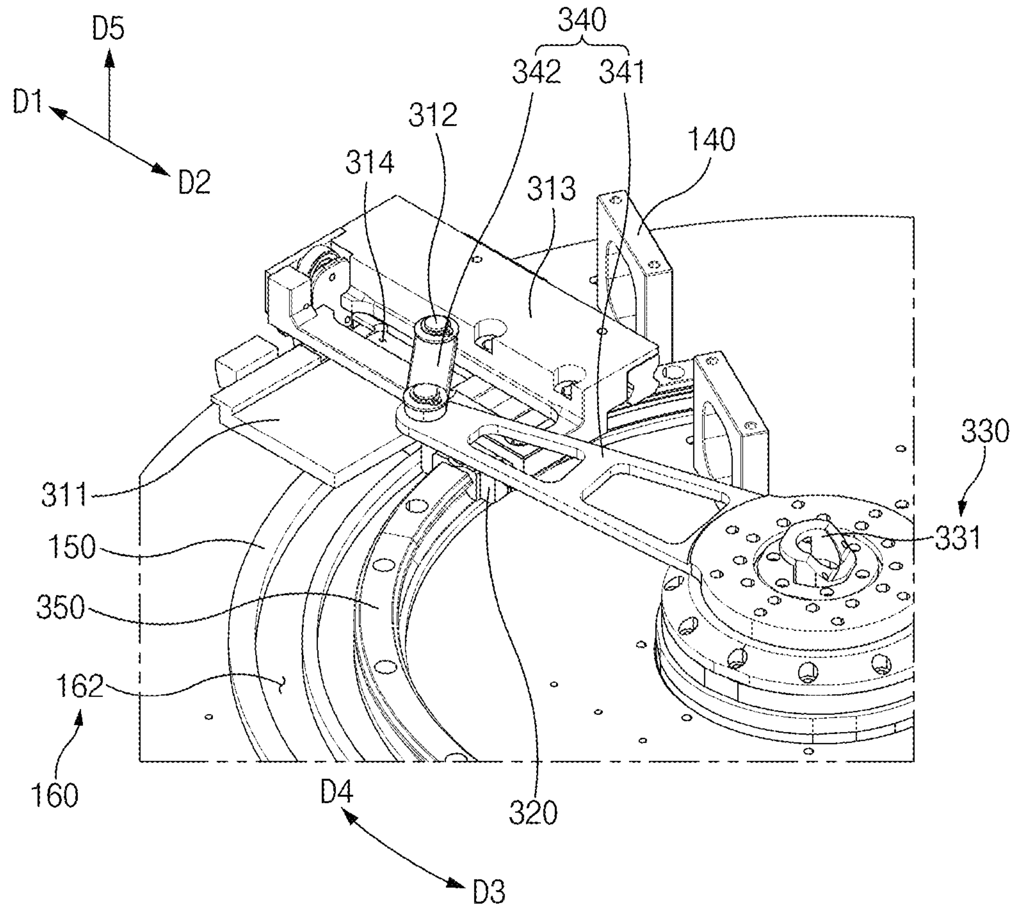
FIG. 10 is a view illustrating the first maneuver performed in FIG. 7.
Figure 11:
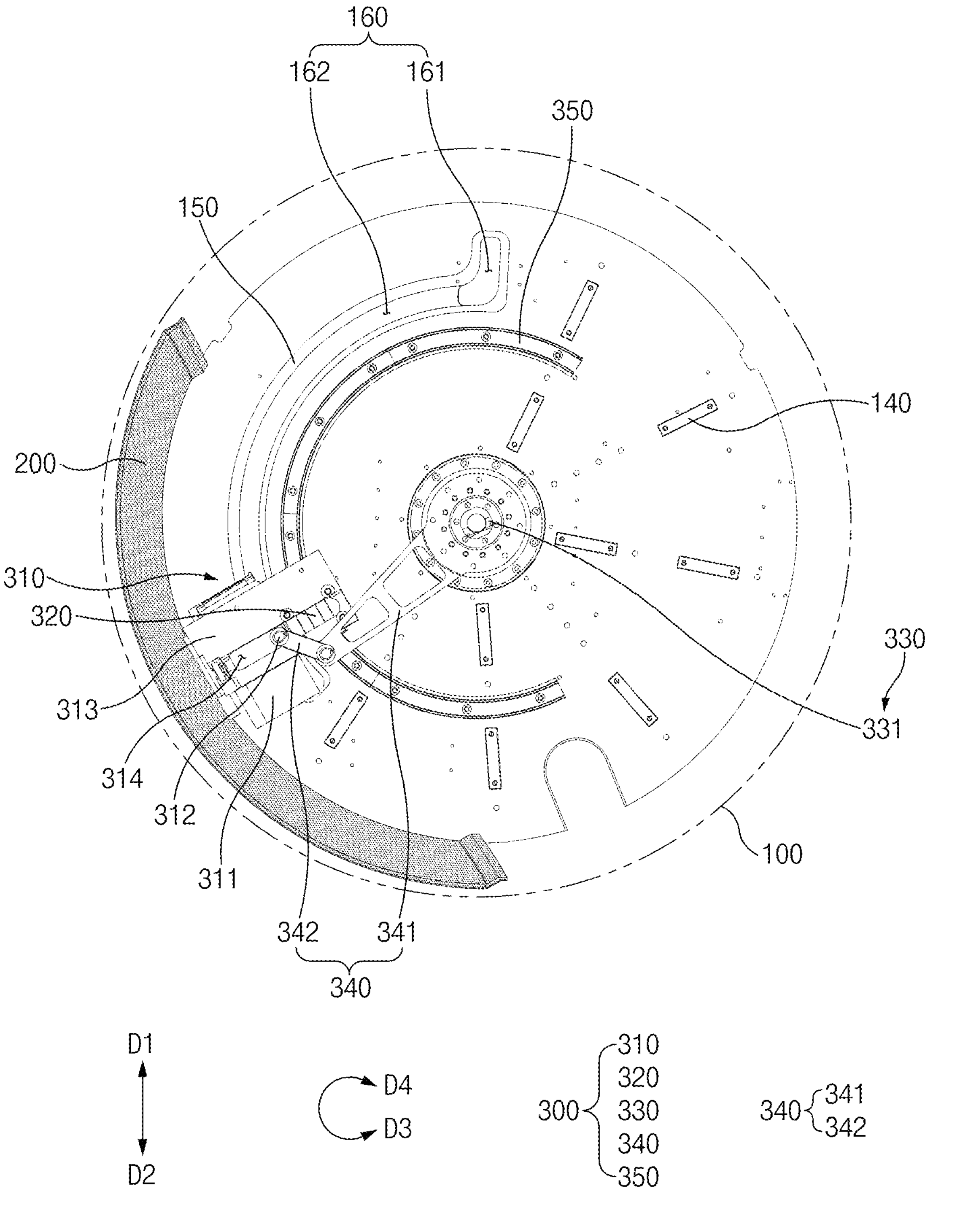
FIG. 11 is a view illustrating an example of a second maneuver performed in FIG. 9.
Figure 12:
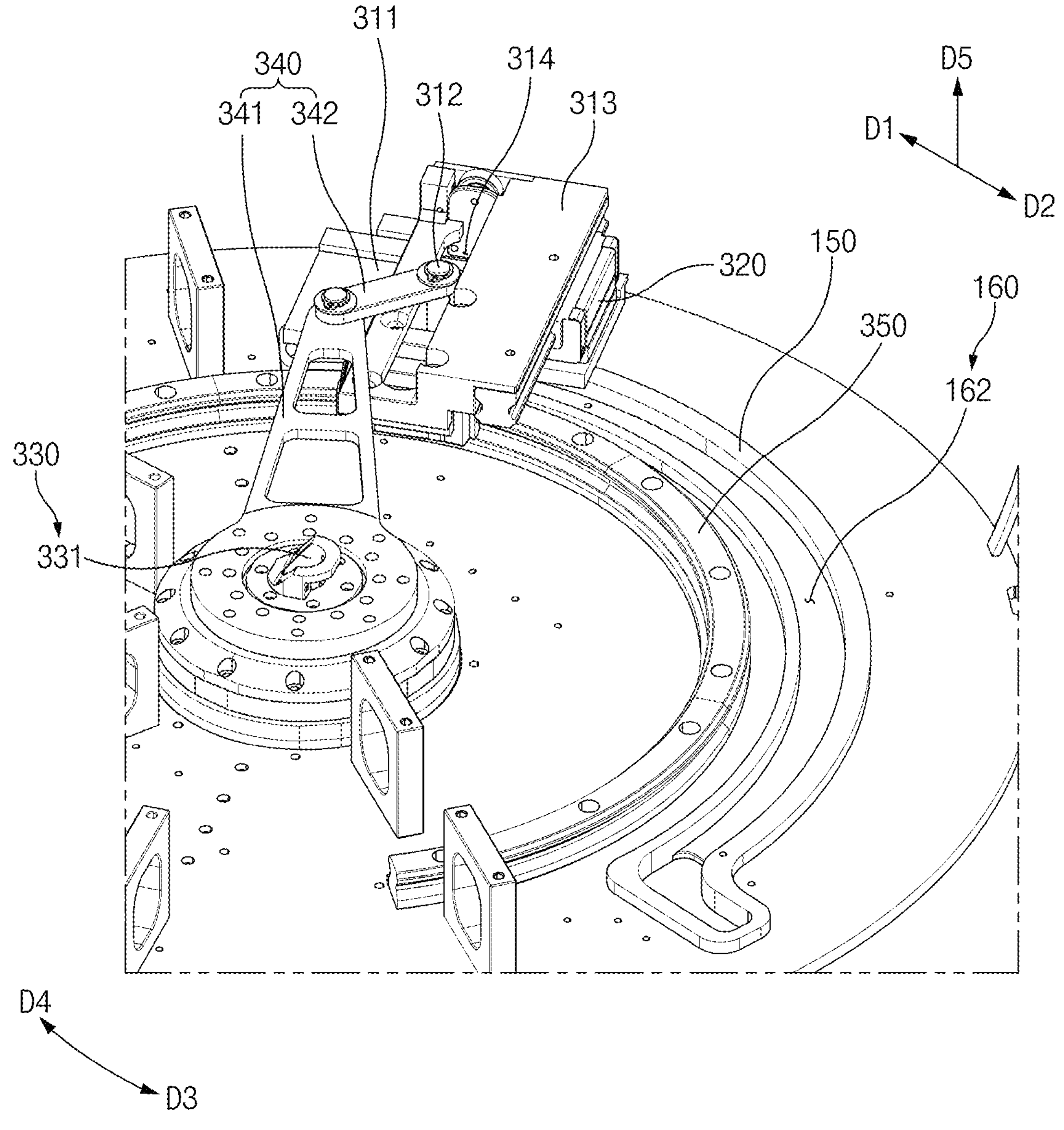
FIG. 12 is a view illustrating the second maneuver performed in FIG. 10.

Hereinafter, the movement of the cover 200 will be described in detail with reference to the above-mentioned structures and the drawings. FIG. 9 is a view illustrating a state in which the first maneuver has been performed in FIG. 6. FIG. 10 is a view illustrating a state in which the first maneuver has been performed in FIG. 7. FIG. 11 is a view illustrating a state in which the second maneuver has been performed in FIG. 9. FIG. 12 is a view illustrating a state in which the second maneuver has been performed in FIG. 10.

The first maneuver will be described. The first maneuver may be understood as a configuration in which the state changes from the state in FIGS. 6 and 7 to the state in FIGS. 9 and 10.

With the operation of the operating member 330, the rotary shaft 331 of the operating member 330 rotates in the third direction D3. During the above-mentioned process, the first link 341 rotates in the third direction D3, and the second link 342 moves the second advance/retraction movement part 312 in the second direction D2 by a connection relationship between the guide hole 314 and the second advance/retraction movement part 312. During this process, the movement of the advance/retraction movement member 310 in the third direction D3 is not allowed by the insertion part 315 and the advance/retraction guide region 161. Therefore, the cover 200 moves only in the second direction D2.

In some examples, during the process in which the cover 200 moves in the second direction D2, the insertion part 315 departs from the advance/retraction guide region 161 and enters the rotation guide region 162. In addition, after the second link 342 and the guide hole 314 are disposed orthogonally, the movement of the second advance/retraction movement part 312 in the second direction D2 is restricted by the first link 341 that is about to move in the third direction D3. Therefore, in consideration of the fourth maneuver, the design may be implemented so that the insertion part 315 departs from the advance/retraction guide region 161 and enters the rotation guide region 162 when an angle defined between the second link 342 and the guide hole 314 gradually increases and then reaches a predetermined reference angle smaller than 90 degrees.

In some examples, a distance, by which the insertion part 315 moves until the insertion part 315 departs from the advance/retraction guide region 161 and enters the rotation guide region 162, may correspond to a distance by which the second advance/retraction movement part 312 moves until the angle defined between the second link 342 and the guide hole 314 reaches the predetermined reference angle.

The second maneuver will be described. The second maneuver may be understood as a configuration in which the state changes from the state in FIGS. 9 and 10 to the state in FIGS. 11 and 12.

In some examples, based on the first maneuver being completed, the second maneuver may be performed. In this case, a rotational force is applied to the second advance/retraction movement part 312 in the third direction D3, and the rotation of the second advance/retraction movement part 312 in the third direction D3 is allowed because the insertion part 315 has entered the rotation guide region 162. Therefore, as the rotational force is applied to the second advance/retraction movement part 312 in the third direction D3, a force is applied to the advance/retraction movement member 310 so that the advance/retraction movement member 310 moves in the third direction D3. Because the rotational movement member 320 connected to the third advance/retraction movement part 313 is seated on the rail member 350 extending in the third direction D3, the advance/retraction movement member 310 may rotate in the third direction D3. Therefore, the cover 200 connected to the first advance/retraction movement part 311 also moves in the third direction D3. When the second maneuver is completed by the above-mentioned process, the open state is made, such that the user may store items and the like in the internal space 120.

In some implementations, both the advance/retraction movement and the rotational motion may be performed by the rotation of the rotary shaft 331 of the single operating member 330, which may simplify the structure and reduce the weight and costs.

The third maneuver may be understood as a reverse process of the second maneuver, and the fourth maneuver may be understood as a reverse process of the first maneuver. In case that the angle defined between the second link 342 and the guide hole 314 is 90 degrees after the third maneuver is completed as described above, the first link 341 presses the second link 342 in a direction orthogonal to the guide hole 314, and the fourth maneuver may not be smoothly performed. Therefore, the reference angle may be smaller than 90 degrees. For instance, the angle defined between the second link 342 and the guide hole 314 may be 90 degrees or less when the third maneuver is completed.

Hereinafter, constituent elements, which may be further provided in the cabin 10, will be described in detail.

In some implementations, the body 100 may include the shield member 130 (FIG. 5). The shield member 130 may be disposed in the internal space 120 and disposed at a side of the cover moving part 300 based on the fifth direction D5. The shield member 130 may cover the cover moving part 300 when viewed in the fifth direction D5. In other words, the cover moving part 300 may be understood as being disposed in a space between the shield member 130 and the surface of the body 100 based on the direction opposite to the fifth direction D5.

The cabin 10 may further include support members 140 (FIG. 7). The support member 140 may be a member protruding in the fifth direction D5 from the surface of the body 100 based on the direction opposite to the fifth direction D5 and configured to support the shield member 130. A length of the support member 140 in the fifth direction D5 may be longer than a length of the cover moving part 300 in the fifth direction D5.

In some implementations, the cabin 10 may further include a camera part 400 (FIG. 5). The camera part 400 may be coupled to a side of the shield member 130 based on the fifth direction D5 and configured to capture an image of the internal space 120. Therefore, images of items disposed in the internal space 120 may be captured.

Another example of a cabin for a movable object will be described with reference to FIGS. 13 to 17. The description of the cabin for a movable object will be focused on a difference from the implementations described above.

Figure 13:
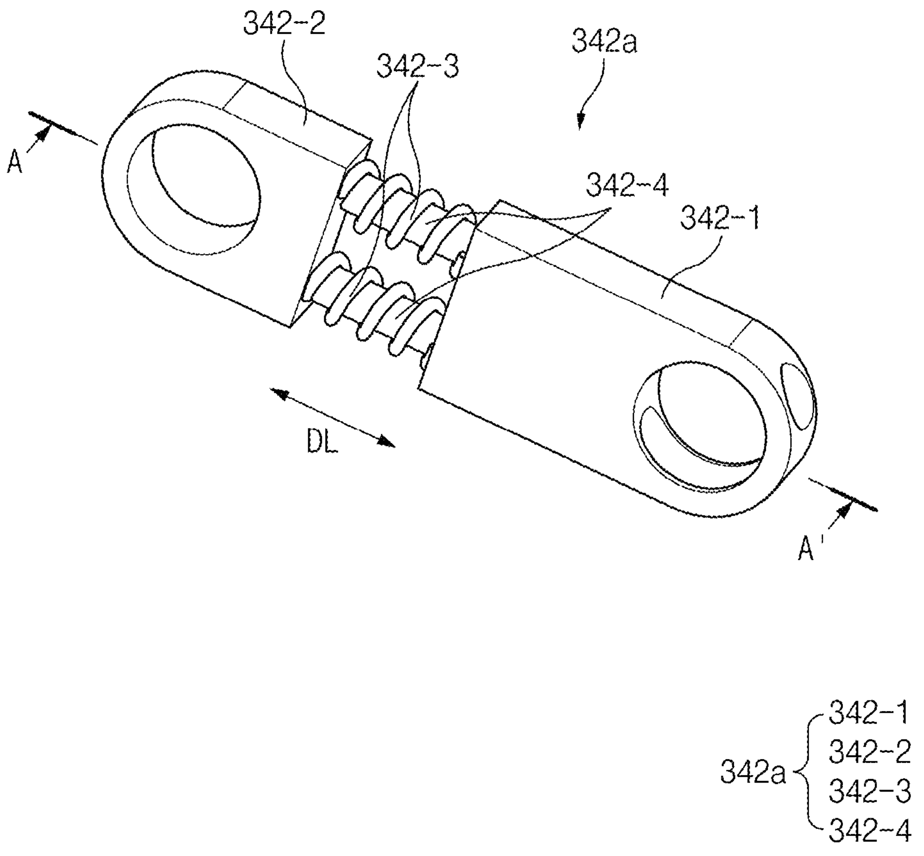
FIG. 13 is a perspective view illustrating an example of a second link.
Figure 14:
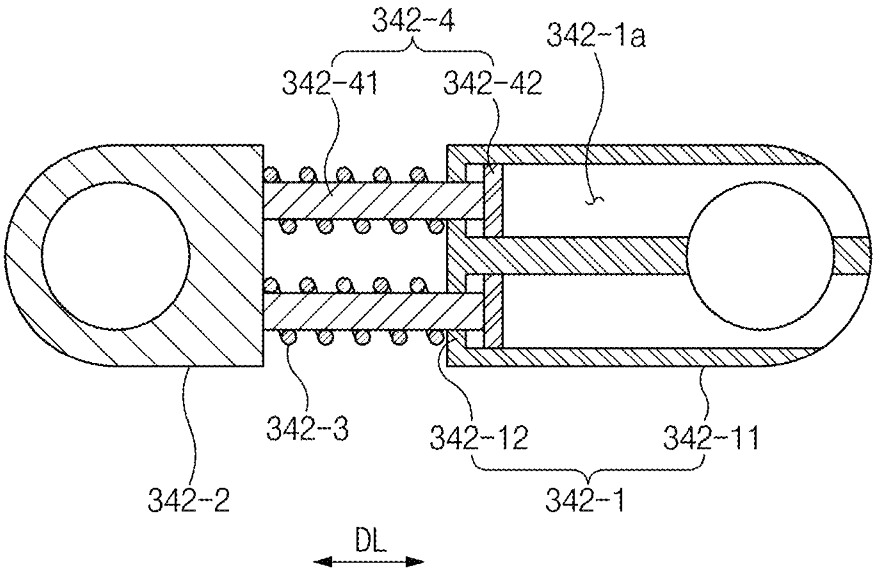
FIG. 14 is a cross-sectional view of the second link taken along line A-A' in FIG. 13.
Figure 15:
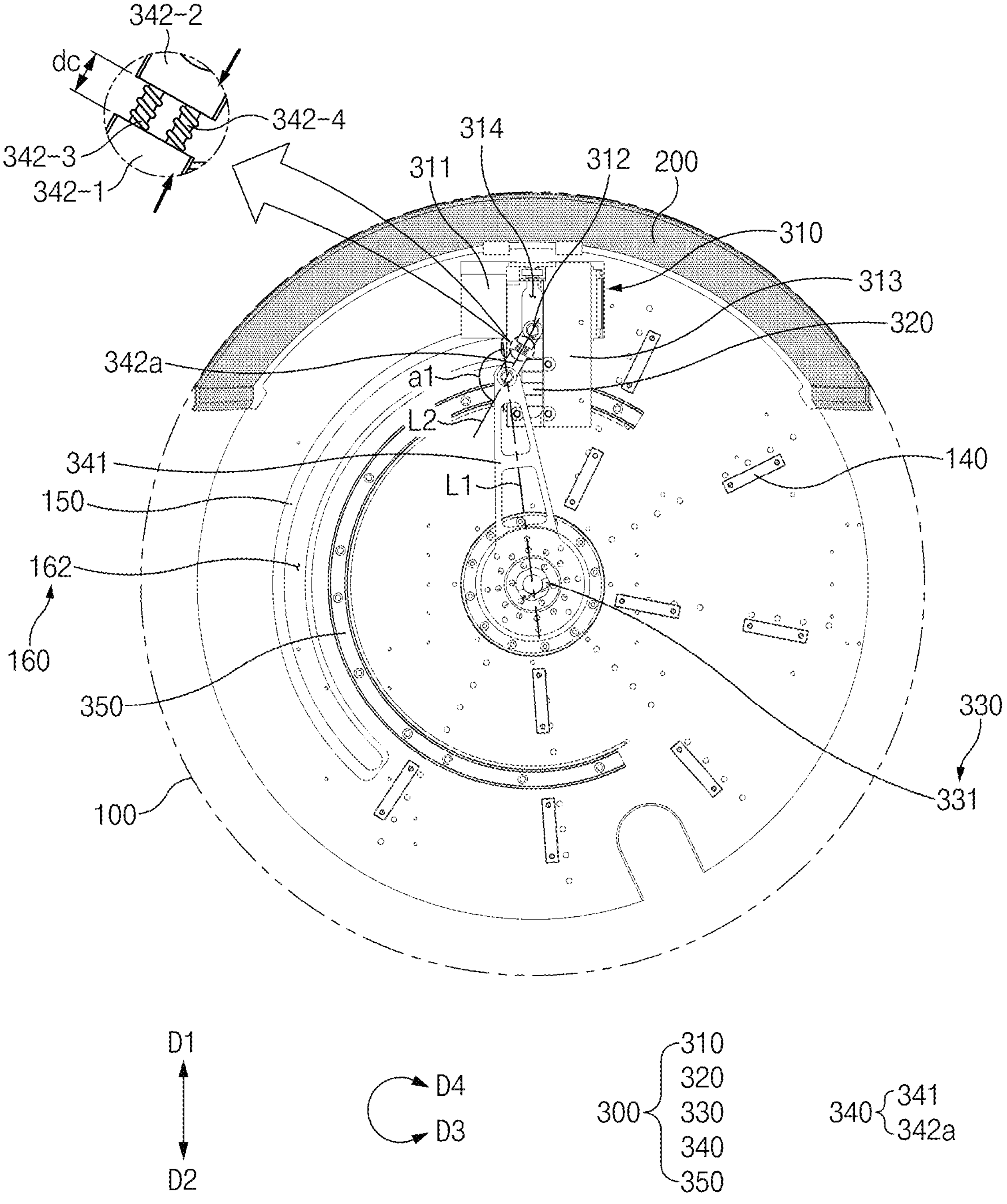
FIG. 15 is a view illustrating an example of a cover moving part in a closed state of a cabin for a movable object when viewed in a fifth direction in a state in which a shield member is excluded.
Figure 16:
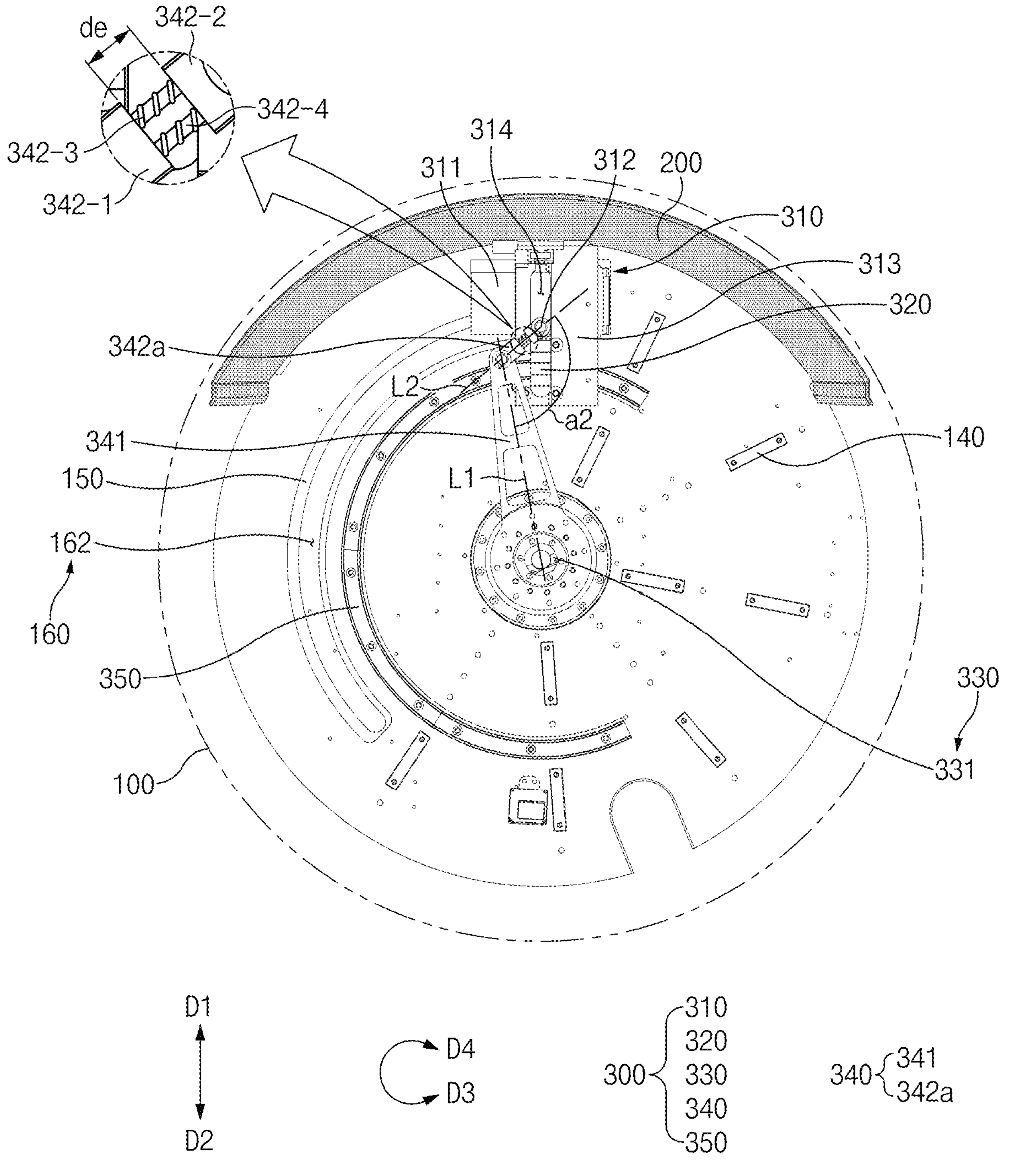
FIG. 16 is a view illustrating an example of a first maneuver performed in FIG. 15.
Figure 17:
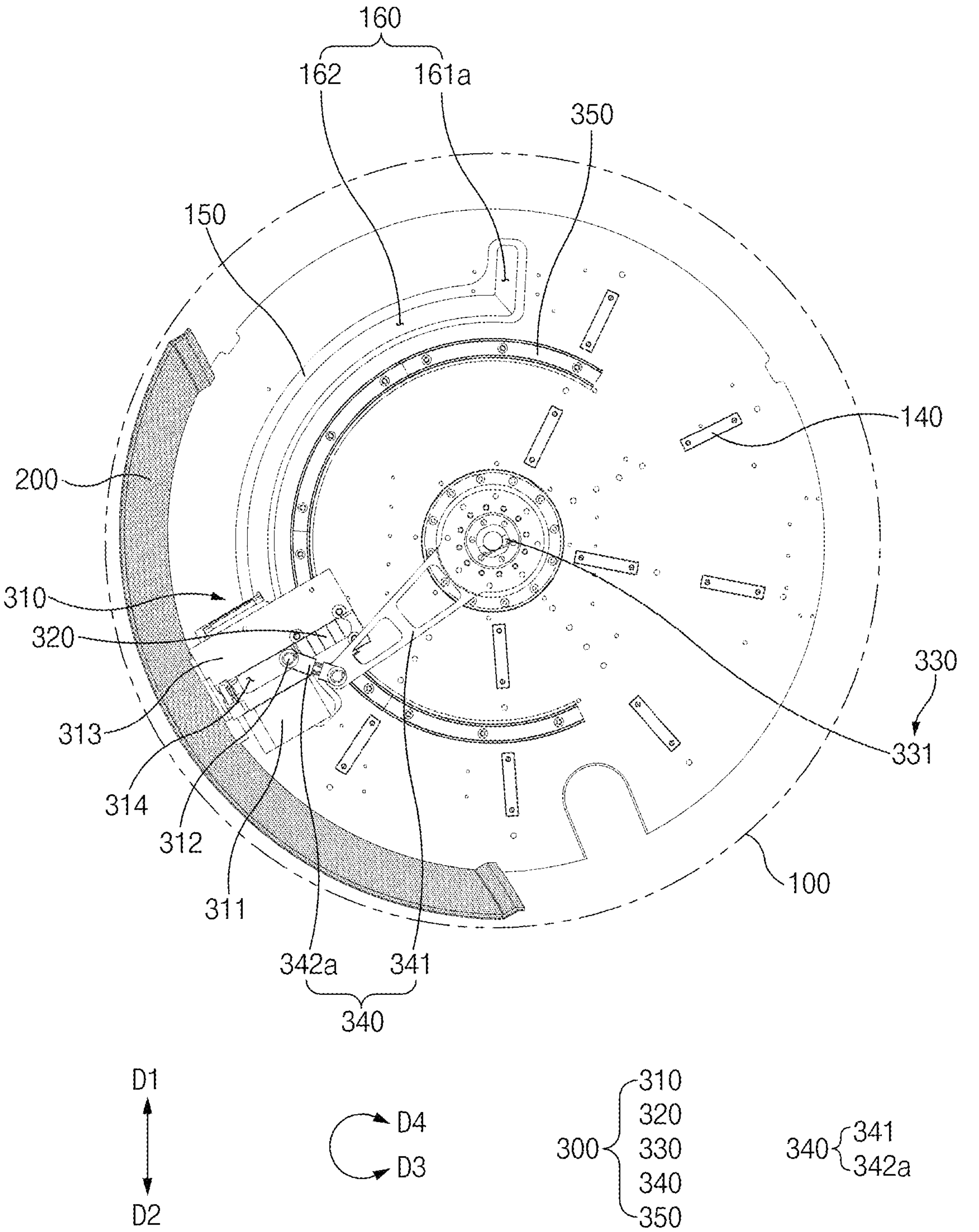
FIG. 17 is a view illustrating an example of a second maneuver performed in FIG. 16.

FIG. 13 is a perspective view of a second link, FIG. 14 is a cross-sectional view of the second link taken along line A-A' in FIG. 13, FIG. 15 is a view illustrating a cover moving part in a closed state of the cabin for a movable object when viewed in the fifth direction in a state in which a shield member is excluded, FIG. 16 is a view illustrating a state in which a first maneuver has been performed in FIG. 15, and FIG. 17 is a view illustrating a state in which a second maneuver has been performed in FIG. 16.

The cabin for a movable object may include the body 100, the cover 200, the cover moving part 300, and the camera part 400. The descriptions of the cover 200, the cover moving part 300, and the camera part 400 may be replaced with the descriptions of the cover 200, the cover moving part 300, and the camera part 400.

The body 100 may include the opening 110, the internal space 120, the shield member 130, the support member 140, the guide part 150, and the guide groove 160. The descriptions of the opening 110, the internal space 120, the shield member 130, the support member 140, and the guide part 150 may be replaced with the descriptions of the opening 110, the internal space 120, the shield member 130, the support member 140, and the guide part 150.

The guide groove 160 may be formed in the body 100 and have a shape recessed toward one side based on the direction of the operating rotation shaft 331 (e.g., the direction opposite to the fifth direction D5). The insertion part 315 may be inserted into the guide groove 160. The guide groove 160 may include an advance/retraction guide region 161*a* and the rotation guide region 162.

With reference to FIG. 17, the advance/retraction guide region 161*a* may extend in the second direction D2. In addition, the rotation guide region 162 may extend in a revolution direction from the end of the advance/retraction guide region 161*a* based on the second direction D2. The revolution direction may refer to a direction in which the rotational movement member 320 revolves the advance/retraction movement member 310 around the operating rotation shaft 331.

The advance/retraction guide region 161*a* and the rotation guide region 162 may define an intersection region. The intersection region may be defined as a region in which the advance/retraction guide region 161*a* and the rotation guide region 162 intersect each other. For example, an end of the intersection region based on the second direction D2 may be defined by an end of the advance/retraction guide region 161*a* based on the second direction D2. In addition, an end of one side of the intersection region based on the revolution direction (e.g., the fourth direction D4) may be defined by an end of one side of the rotation guide region 162 based on the revolution direction (e.g., the fourth direction D4).

A curvature of the end of the intersection region based on the second direction D2 may correspond to a curvature of an end of any region of the rotation guide region 162 based on an inward advance/retraction direction. The inward advance/retraction direction may refer to a direction in which the cover 200 is directed toward the operating rotation shaft 331.

The description of the cover 200 may be replaced with the description of the cover 200.

The cover moving part 300 may include the advance/retraction movement member 310, the rotational movement member 320, the operating member 330, and the link member 340.

In some implementations, the advance/retraction movement member 310 may include the first advance/retraction movement part 311, the second advance/retraction movement part 312, the third advance/retraction movement part 313, and the guide hole 314. The descriptions of the first advance/retraction movement part 311, the second advance/retraction movement part 312, the third advance/retraction movement part 313, and the guide hole 314 may be replaced with the descriptions of the first advance/retraction movement part 311, the second advance/retraction movement part 312, the third advance/retraction movement part 313, and the guide hole 314.

The descriptions of the rotational movement member 320 and the operating member 330 may be replaced with the descriptions of the rotational movement member 320 and the operating member 330.

The link member 340 may include the first link 341 and a second link 342*a*. The description of the first link 341 may be replaced with the description of the first link 341.

In some implementations, with reference to FIGS. 13 and 14, the second link 342*a* may be configured to be stretchable and contractible so that a spacing distance between two opposite ends thereof increases or decreases. The second link 342*a* may include a first region 342-1, a second region 342-2, elastic members 342-3, and stretch/contraction guides 342-4.

The first region 342-1 may define one end (i.e., first end) of the second link 342*a*. For example, assuming that a direction in which the first region 342-1 and the second region 342-2 face each other is a link direction DL, the first region 342-1 may define one end of the second link 342*a* based on the link direction DL. The link direction DL may include a first link direction and a second link direction. The first link direction may be defined as one direction in which the second region 342-2 is directed toward the first region 342-1. The second link direction may be defined as a direction opposite to the first link direction.

For example, the first region 342-1 may be rotatably connected to the second link 342*a*. For example, the first region 342-1 may be configured to rotate about a first rotation center relative to the second link 342*a*.

Insertion grooves 342-1*a* may be formed in the first region 342-1. A part of the stretch/contraction guide 342-4 may be inserted into the insertion groove 342-1*a*. The insertion groove 342-1*a* may extend in the first link direction. The insertion groove 342-1*a* may be provided as a plurality of insertion grooves 342-1*a*. The plurality of insertion grooves 342-1*a* may be disposed to be spaced apart from one another in a direction intersecting the link direction DL. The first region 342-1 may include a first body 342-11 and catching portions 342-12.

The first body 342-11 may define an external appearance of the first region 342-1. The plurality of insertion grooves 342-1*a* may be formed in the first body 342-11. The first body 342-11 may include a wall surface that surrounds the insertion grooves 342-1*a*.

A protruding portion 342-42 to be described below may be caught by the catching portion 342-12. The catching portion 342-12 may define an end of the insertion groove 342-1*a* based on the second link direction. The catching portion 342-12 may have a shape protruding toward a center of the insertion groove 342-1*a* from the wall surface that surrounds the insertion groove 342-1*a*. A width of an inner peripheral surface of the catching portion 342-12 in a direction perpendicular to the link direction DL may be smaller than a width of the wall surface in the direction perpendicular to the link direction DL. In other words, a width of an end (hereinafter, referred to as an 'end region') of the insertion groove 342-1*a* based on the second link direction in the direction perpendicular to the link direction DL may be smaller than a width of the remaining region of the insertion groove 342-1*a* (hereinafter, referred to as the 'remaining region') in the direction perpendicular to the link direction DL.

The second region 342-2 may define the other end (i.e., the second end) of the second link 342*a*. For example, the second region 342-2 may define the other end of the second link 342*a* based on the link direction DL. The other end of the second link 342*a* based on the link direction DL may refer to an end opposite to one end of the second link 342*a* based on the link direction DL.

The second region 342-2 may be rotatably connected to the cover 200. For example, the second region 342-2 may be rotatably connected to the second advance/retraction movement part 312. In a detailed example, the second region 342-2 may be configured to rotate about a second rotation center relative to the second advance/retraction movement part 312. For example, a length of the second region 342-2 in the link direction DL may be shorter than a length of the first region 342-1 in the link direction DL. However, the present disclosure is not limited to this example. A length of the second region 342-2 in the link direction DL may be equal to or longer than a length of the first region 342-1 in the link direction DL.

The elastic member 342-3 may be disposed between the first region 342-1 and the second region 342-2 based on the link direction DL. For example, the first region 342-1 and the second region 342-2 may be disposed to be spaced apart from each other in the link direction DL with the elastic member 342-3 interposed therebetween.

The elastic member 342-3 may be placed in a stretched state in which the elastic member 342-3 is maximally stretched or a contracted state in which the elastic member 342-3 is contracted from the stretched state. With reference to FIG. 16, in the stretched state of the elastic member 342-3, a spacing distance de between the first region 342-1 and the second region 342-2 may be a maximum spacing distance.

In addition, with reference to FIG. 15, the spacing distance between the first region 342-1 and the second region 342-2 may be smaller in the contracted state of the elastic member 342-3 than in the stretched state.

In the contracted state, a restoring force may be applied to the elastic member 342-3 in a direction in which the first region 342-1 and the second region 342-2 move away from each other. For example, the elastic member 342-3 may have a coil spring shape having a hollow portion extending in the link direction DL. For example, the elastic member 342-3 may be a compression coil spring. The elastic member 342-3 may be provided as a plurality of elastic members 342-3.

With reference to FIGS. 15 and 16, assuming that an imaginary straight line passing through the operating rotation shaft 331 and the first rotation center is a first straight line L1, an imaginary straight line passing through the first rotation center and the second rotation center is a second straight line L2, an angle defined between the first straight line L1 and the second straight line L2 in the contracted state of the elastic member 342-3 is a contraction angle a1, and an angle defined between the first straight line L1 and the second straight line L2 in the stretched state of the elastic member 342-3 is a stretch angle a2, the contraction angle a1 may be equal to or larger than the stretch angle a2.

The stretch/contraction guide 342-4 may connect the first region 342-1 and the second region 342-2 in the link direction DL. The stretch/contraction guide 342-4 may guide the stretch and contraction of the elastic member 342-3 in the link direction DL. The stretch/contraction guide 342-4 may penetrate the hollow portion and be inserted into the hollow portion of the elastic member 342-3. The stretch/contraction guide 342-4 may be provided as a plurality of stretch/contraction guides 342-4.

The plurality of elastic members 342-3 may respectively correspond to the plurality of stretch/contraction guides 342-4 in a one-to-one manner. For example, any one stretch/contraction guide 342-4, among the plurality of stretch/contraction guides 342-4, may be disposed to be inserted into the hollow portion of any one elastic member 342-3 among the plurality of elastic members 342-3. The stretch/contraction guide 342-4 may include a column portion 342-41 and the protruding portion 342-42.

The column portion 342-41 may have a shape surrounded by the elastic member 342-3 in the stretched state. For example, the column portion 342-41 may have a column shape extending in the link direction DL. A width of the column portion 342-41 in the direction perpendicular to the link direction DL may be equal to or smaller than a width of the insertion groove 342-1*a* in the direction perpendicular to the link direction DL. The protruding portion 342-42 may be disposed at an end of the column portion 342-41 based on the first link direction.

The protruding portion 342-42 may have a shape protruding from the column portion 342-41 in a direction intersecting the link direction DL. The protruding portion 342-42 may be disposed to be inserted into the remaining region of the insertion groove 342-1*a*. In addition, the protruding portion 342-42 may not be disposed in the end region of the insertion groove 342-1*a*. For example, a width of the protruding portion 342-42 in the direction perpendicular to the link direction DL may be larger than a width of the end region of the insertion groove 342-1*a* in the direction perpendicular to the link direction DL. In a more detailed example, a width of the protruding portion 342-42 in the direction perpendicular to the link direction DL may be smaller than a width of the remaining region of the insertion groove 342-1*a* in the direction perpendicular to the link direction DL.

In the stretched state of the elastic member 342-3, the end of the protruding portion 342-42 based on the second link direction and the end of the catching portion 342-12 based on the first link direction may be in contact with each other. In other words, in the stretched state of the elastic member 342-3, the protruding portion 342-42 may prevent the stretch/contraction guide 342-4 from being separated from the insertion groove 342-1*a*.

In addition, in the contracted state of the elastic member 342-3, the end of the protruding portion 342-42 based on the second link direction and the end of the catching portion 342-12 based on the first link direction may be spaced apart from each other. The above description is simply given for illustratively describing the technical spirit of the present disclosure, and those skilled in the art to which the present disclosure pertains will appreciate that various changes and modifications are possible without departing from the essential characteristic of the present disclosure. Therefore, the implementations of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical spirit in the equivalent scope thereto should be construed as falling within the scope of the present disclosure.

What is claimed is:

1. A cabin for a movable object, the cabin comprising:

a body that defines (i) an opening opened in a first direction and (ii) an internal space that is in fluid communication with the opening;

a cover configured to open and close at least a portion of the opening; and a cover moving part disposed in the internal space of the body and coupled to the cover, the cover moving part being configured to at least one of linearly move the cover or rotate the cover, wherein the cover moving part comprises:

an operating member comprising an operating rotation shaft that extends in an axial direction intersecting the first direction, the operating member being disposed at the body and configured to rotate about the operating rotation shaft, and a link member that connects the operating member and the cover to each other and is configured to transmit power generated by the operating member to the cover, wherein the link member comprises:

a first link connected to the operating member and configured to rotate about the operating rotation shaft, and a second link that connects the first link to the cover, the second link having (i) a first end rotatably connected to the first link and (ii) a second end rotatably connected to the cover, and wherein the second link is configured to stretch and contract to thereby increase and decrease a distance between the first and second ends of the second link.

2. The cabin of claim 1, wherein the second link comprises:

a first region that is rotatably connected to the first link and defines the first end of the second link;

a second region that is rotatably connected to the cover and defines the second end of the second link; and an elastic member disposed between the first region and the second region, wherein the elastic member is configured to:

based on being stretched to a stretched state, define a maximum spacing distance between the first and second ends of the second link, and based on being contracted to a contracted state, define the distance between the first region and the second region that is less than the maximum spacing distance, and wherein the elastic member is configured to, in the contracted state, apply a restoring force that pushes the first region and the second region away from each other.

3. The cabin of claim 2, wherein the second link extends in a link direction in which the first region and the second region face each other, and wherein the second link further comprises a stretch/contraction guide that connects the first region to the second region in the link direction and is configured to guide movement of the elastic member in the link direction.

4. The cabin of claim 3, wherein the elastic member has a coil spring shape having a hollow portion that extends in the link direction, and wherein the stretch/contraction guide passes through the hollow portion of the elastic member.

5. The cabin of claim 3, wherein the elastic member is one of a plurality of elastic members disposed between the first region and the second region, wherein the stretch/contraction guide is one of a plurality of stretch/contraction guides that are respectively disposed in the plurality of elastic members, and wherein a number of the plurality of elastic members is equal to a number of the plurality of stretch/contraction guides.

6. The cabin of claim 3, wherein the second link defines an insertion groove in the first region, the insertion groove extending in the link direction and being configured to receive a part of the stretch/contraction guide inserted into the insertion groove, wherein the stretch/contraction guide comprises:

a column portion surrounded by the elastic member; and a protruding portion disposed at an end of the column portion at the first region and inserted in the insertion groove, the protruding portion protruding from the column portion in a direction intersecting the link direction, wherein the first region comprises a catching portion that protrudes from a wall surface that surrounds the insertion groove toward a center of the insertion groove, the catching portion being configured to catch the protruding portion in the insertion groove.

7. The cabin of claim 6, wherein an end of the protruding portion and an end of the catching portion face each other in the link direction and are configured to:

contact each other based on the elastic member being in the stretched state, and separate from each other based on the elastic member being in the contracted state.

8. The cabin of claim 2, wherein the first link and the second link are configured to define an obtuse angle between (i) a first straight line that radially extends from the operating rotation shaft to a first rotation center at an end of the first link connected to the first end of the second link and (ii) a second straight line that extends from the first rotation center of the first link to a second rotation center of the second link at the second end of the second link connected to the cover, and wherein a size of the obtuse angle defined between the first straight line and the second straight line in the contracted state of the elastic member is greater than equal to a size of the obtuse angle defined between the first straight line and the second straight line in the stretched state of the elastic member.

9. The cabin of claim 1, wherein the cover faces the operating rotation shaft in an advance/retraction direction, wherein the advance/retraction direction is parallel to the first direction in a state in which the cover is placed in a closed state in which the cover closes the opening, and wherein the cover moving part comprises an advance/retraction movement member configured to linearly move in the advance/retraction direction relative to the body, the advance/retraction movement member having (i) a first side fixed to the cover and (ii) a second side rotatably connected to the second link.

10. The cabin of claim 9, wherein the advance/retraction movement member comprises:

a first advance/retraction movement part fixed to the cover; and a second advance/retraction movement part having one side fixed to the first advance/retraction movement part and another side rotatably connected to the second link, wherein the cover moving part further comprises a rotational movement member configured to revolve the advance/retraction movement member about the operating rotation shaft along a predetermined rotation radius, wherein the advance/retraction movement member defines a guide hole that passes through the advance/retraction movement member in the axial direction of the operating rotation shaft and receives the second advance/retraction movement part, and wherein the guide hole extends in the advance/retraction direction and is configured to guide linear movements of the first advance/retraction movement part and the second advance/retraction movement part in the advance/retraction direction.

11. The cabin of claim 10, wherein the body defines a guide groove recessed toward one side of the body in the axial direction of the operating rotation shaft, wherein the advance/retraction movement member further comprises an insertion part that is inserted into the guide groove and protrudes toward the one side of the body relative to the first advance/retraction movement part in the axial direction of the operating rotation shaft, wherein the rotational movement member is configured to revolve the advance/retraction movement member in a revolution direction, and wherein the guide groove comprises:

an advance/retraction guide region extending in a second direction that is opposite to the first direction, and a rotation guide region extending in the revolution direction from an end of the advance/retraction guide region.

12. The cabin of claim 11, wherein the guide groove further comprises an intersection region in which the advance/retraction guide region and the rotation guide region intersect each other, wherein the cover is configured to be directed toward the operating rotation shaft in an inward advance/retraction direction, and wherein a curvature of an end of the intersection region in the second direction corresponds to a curvature of an inner side of the rotation guide region in the inward advance/retraction direction.

13. A movable object comprising:

a cabin; and a movable part connected to the cabin and configured to move the cabin, wherein the cabin comprises:

a body that defines (i) an opening opened in a first direction and (ii) an internal space that is in fluid communication with the opening, a cover configured to open and close the opening, and a cover moving part disposed in the internal space of the body and coupled to the cover, the cover moving part being configured to at least one of linearly move or rotate the cover, wherein the cover moving part comprises:

an operating member comprising an operating rotation shaft that extends in an axial direction intersecting the first direction, the operating member being disposed at the body and configured to rotate about the operating rotation shaft, and a link member that connects the operating member and the cover to each other and is configured to transmit power generated by the operating member to the cover, wherein the link member comprises:

a first link connected to the operating member and configured to rotate about the operating rotation shaft, and a second link that connects the first link to the cover, the second link having (i) a first end rotatably connected to the first link and (ii) a second end rotatably connected to the cover, and wherein the second link is configured to stretch and contract to thereby increase and decrease a distance between the first and second ends of the second link.

14. The movable object of claim 13, wherein the movable part comprises one or more wheels disposed below the cabin.

* * * * *